United States Patent Office 3,120,301
Patented Feb. 4, 1964

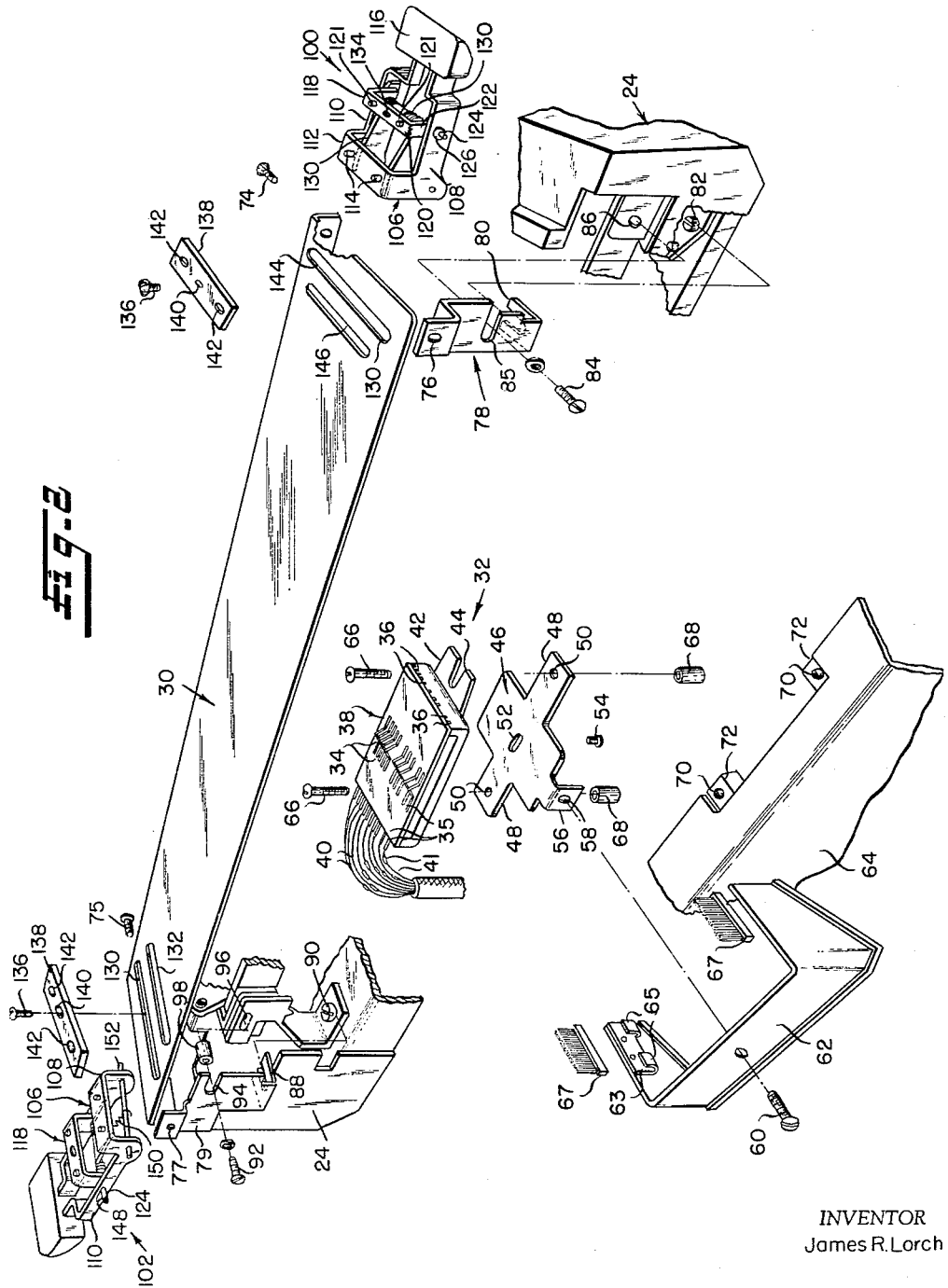

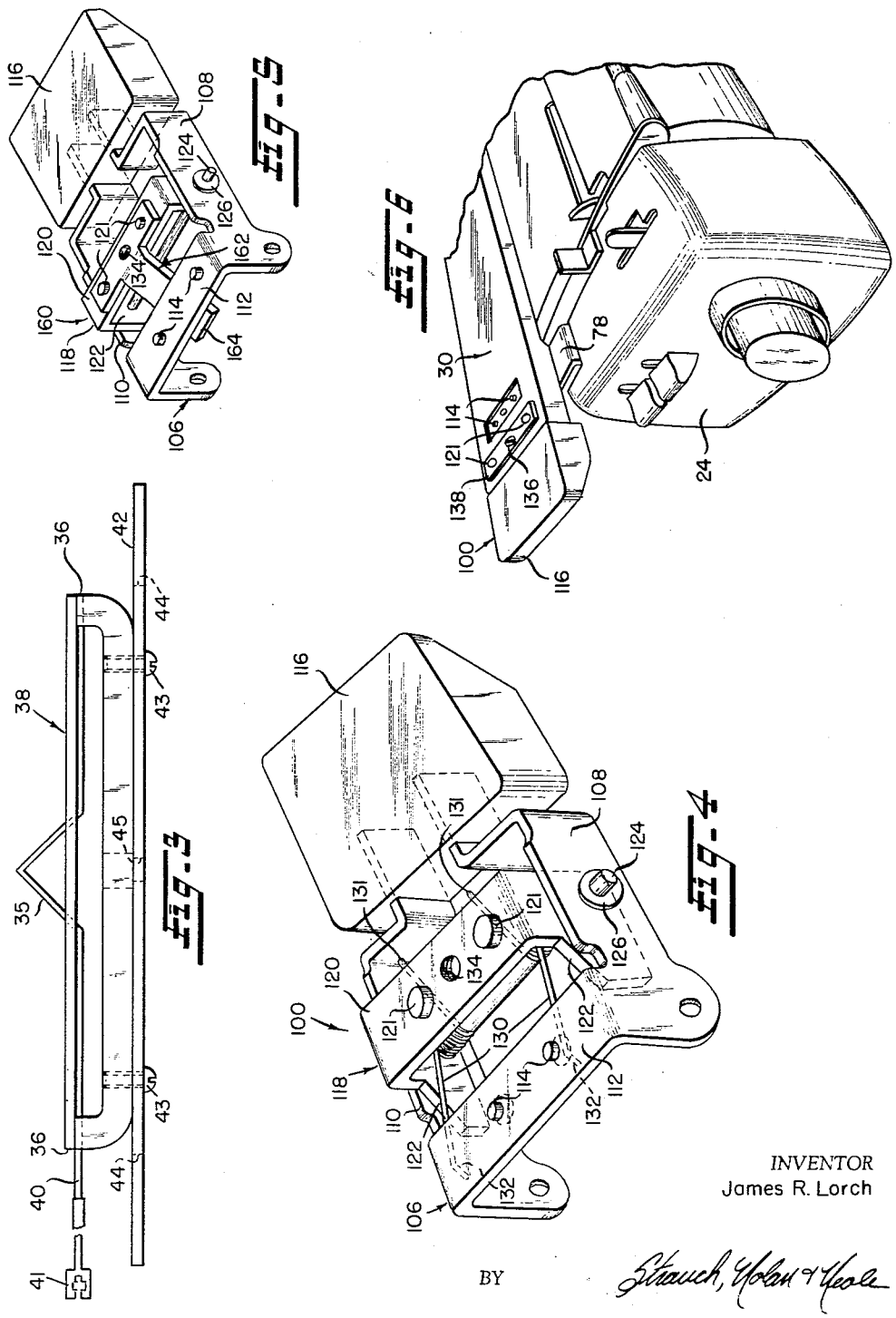

3,120,301
PROGRAM DEVICE
James R. Lorch, Pinole, Calif., assignor to SCM
Corporation, a corporation of New York
Filed Apr. 3, 1961, Ser. No. 100,169
18 Claims. (Cl. 197—20)

The invention relates to programming devices adapted for use with a business machine having a movable carriage such for example as a typewriter, for conditioning electrical switches in response to the carriage position. More specifically, the invention pertains to a perforated tape secured to the movable carriage to thereby be moved by the carriage directly, and without extra driving means, past a tape perforation sensing station to thus produce electrical signals for programming related data processing equipment.

Prior program devices on a standard electric typewriter, such as that shown in Edminster et al. U.S. Patent No. 2,800,539, have used a continuous perforated tape which moved in response to the movement of a typewriter carriage to turn on and off auxiliary equipment, such as perforated card or tape readers and punches, in a data processing system where the typewriter is used as an input-output unit. In the Edminster et al. device, a star wheel sprocket drive is connected by a drive train to be driven by a rack carried directly by the typewriter carriage. To adapt this type of programming device for use on a standard typewriter, extensive modifications must be made to the typewriter such as adding plural gear drive trains, and a star wheel sprocket drive for moving the tape with the carriage of the business machine. Additionally, to get proper programming the continuous tape must be closely inspected before placing it on the star wheel drive to insure proper orientation of the tape relative to the carriage.

The program device of the present invention is easily attached to a standard typewriter and eliminates the complex gear train of the prior art devices. In the device of the present invention, the program tape is moved past a sensing station concomitantly with movement of the typewriter carriage as the program tape is directly secured, at least at one end, to the typewriter carriage. Further, the program tape of the instant invention is easily adjusted and other tapes for differing programs are readily interchangeable in that a strip of program tape is easily attached to opposite ends of a tape carrier by projecting pins which extend through holes in the ends of the program tape.

Accordingly, it is the primary object of this invention to provide an improved programming device for conditioning electrical circuits in response to the position of a business machine carriage.

Another important object of this invention is to provide an improved programming device which has a program tape directly mounted on the carriage of a business machine for movement therewith whereby the programming device will operate to condition electrical switches in response to the carriage position of the business machine.

Further objects of the invention are to provide a novel arrangement for mounting of the program tape on the carriage of a business machine having the characteristics of being easily removable to thereby permit quick interchangeability of tapes along with means for properly positioning and holding the tape taut.

These and other objects of the invention will become more fully apparent from the claims, and from the description as it proceeds in connection with the drawings wherein:

FIGURE 2 is an exploded view of the programming device as shown in FIGURE 1;

FIGURE 3 is a side elevation view of the contact assembly;

FIGURE 4 is a pictorial view of a preferred embodiment of one of the tape mounting assemblies;

FIGURE 5 is a pictorial view of an alternative construction for the tape mounting assembly of FIGURE 4; and FIGURE 6 is a partial view in perspective showing how the tape backing plate is secured to the carriage on the typewriter of FIGURE 1.

Figure 1:
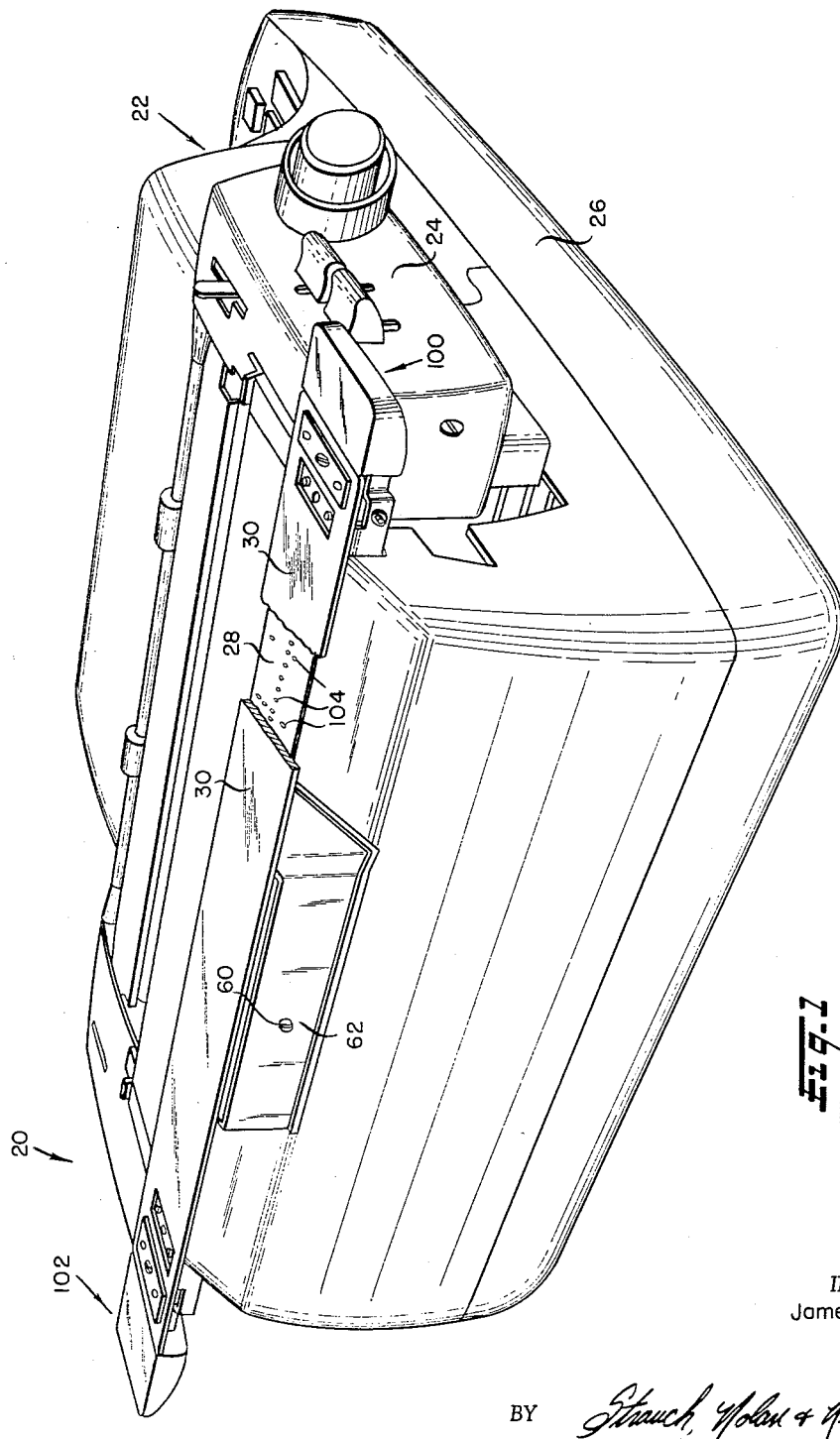
FIGURE 1 is a view in perspective of a typewriter which embodies the present invention.

Referring now to the drawings and more particularly to FIGURE 1, a typical typewriter 20 is illustrated which has a keyboard 22 on a side only partially visible and a carriage 24 movable transversely of the typewriter base 26 during printing or spacing operation in the usual manner. Mounted on carriage 24 is a program tape 28 which is immediately beneath and in contacting engagement with the metallic bottom face of backing plate 30.

At the center of the rear cover of the typewriter in alignment with the printing position and immediately beneath perforated tape 28 a tape sensing station 32 is provided. As best shown in FIGURE 2, tape sensing station 32 contains eight spring contacts 34 which are adapted to sense or detect the presence of holes in corresponding positions on program tape 28 at each of the stable carriage positions of the typewriter and two spring contacts 35 which ride off the tape along the under metallic surface of backing plate 30 and provide a common current carrier. Each contact 34 and 35 is preferably formed of three small wires (see also FIGURE 3) bent into the shape of an inverted V and secured at opposite end rails 36 of contact carrying block 38. The ends of the contact members 34 and 35 are connected at one rail to electrical conductor leads 40 which are adapted to be connected to the auxiliary equipment in a known manner as by solderless socket connector members 41.

The manner of the construction of the contacts 34 and 35 and their mounting on the ends 36 of contact carrying block 38 may be similar to that described and claimed in copending application of Gim Chan, Serial No. 64,405 filed October 24, 1960, now U.S. Patent No. 3,072,238; or as disclosed in my application entitled Method of and Apparatus for Making Brush Contact Assemblies Serial No. 118,177, filed June 19, 1961 and all assigned to a common assignee.

The number of contacts 34 provided corresponds to the number of information-containing channels in perforated tape 28. Where tape 28 contains eight information channels there will be a corresponding number of contacts 34. Contacts 35 are connected in parallel to provide increased current carrying capacity. The contact wire size is necessarily small to obtain proper amount of resilience of the contacts to minimize wear on program tape 28 which may be of "Mylar."

Contact carrying block 38 is preferably secured to contact carrier plate 42 as by four screws 43 (FIGURE 3). Contact carrier plate 42 is provided with slots 44 (FIGURE 2) on opposite ends of block 38 and a centrally located threaded aperture 45 which is shown in dotted lines in FIGURE 3.

Beneath contact carrier plate 42 is a mounting plate 46 which is provided with oppositely extending ears 48, each of which contains an aperture 50. A centrally located slot 52 is provided in mounting plate 46 so that contact carrier plate 42 may be secured to mounting plate 46 as by fastener 54.

Mounting plate 46 also has a bent tab 56 which is provided with aperture 58 for receiving fastener 60 to hold substantially U-shaped contact assembly cover 62 in place (see also FIGURE 1) to shield the contact assembly from dust and other foreign objects. Secured to the inside surface of the opposite end extensions of cover 62 are brush holding brackets 63 having spring biased clamps 65 which hold brushes 67. Brushes 67 contact the lower surface of program tape 28 and sweep it clean. The brushes, being carried by the cover 62 are easily removed for cleaning or replacement, if necessary.

Mounting plate 46 is secured to the rear cover 64 as by screws 66. Carrier plate 42 is secured to mounting plate 46 by screw 54 through slot 52. Screws 66 have elongated concentric cylindrical heads which guidably position carrier plate 42 by means of slots 44 relative to mounting plate 46, but do not secure carrier plate 42 to mounting plate 46. Screws 66 extend through slots 44 in the contact carrier plate 42, through unthreaded apertures 50 in ears 48 of mounting plate 46, through spacer members 68 and into threaded bores 70 in bosses 72 of typewriter frame 64 to thereby securely hold the contact assembly in place on the back of the typewriter frame.

Tape backing plate 30 is secured at opposite ends to the normally present portion of the typewriter carriage 24 as shown in FIGURE 2 by fasteners 74 and 75 which are received in threaded bores 76 and 77 respectively of brackets 78 and 79. The lower portion of bracket 78 contains a bifurcated end 80 which has a slot that fits under the head on screw 82 which is secured to the typewriter carriage 24. The center portion of bracket 78 is provided with a slot 85 which receives screw 84 which is threadedly received by bore 86 on the typewriter carriage 24.

Bracket 79 is constructed similarly to bracket 78 and the lower bifurcated portion 88 fits under fastener 90 which is secured to the carriage 24 and screw 92 fits through slot 94 and is threadedly received in slot 96 to be secured to typewriter carriage 24. The length of spacer 98 may be chosen to substantially align bracket 79 with bracket 78 so that the longitudinal axis of backing plate 30 is parallel to the direction of the movement of carriage 24.

Program tape 28 (see FIGURE 1) is secured to the under side of backing plate 30 by tape retainer means 100 and 102 for movement with the typewriter carriage relative to the fixed tape sensing assembly station 32. Program tape 28 is preferably of "Mylar" as it has good wear characteristics, and is provided with perforations 104 which are positioned across the tape in alignment with contacts 34 and longitudinally along the tape at distances corresponding to the distance between adjacent stable carriage positions. Thus, when program 28 is moved across contacts 34 of sensing station 32, contact with backing plate 30, which for example may be at ground potential, may complete electrical circuits which are normally open because of the presence of the insulating material of tape 28. The completed circuit or circuits may be utilized to condition switches or electronic circuits to turn on related equipment as a direct function of the letter spacing movement of carriage 24 whereby the entry in each line at a given carriage position may be recorded as by a tape perforator for example. When carriage 24 advances to new carriage position, such related equipment may then be turned off.

Primary functions of backing plate 30 are to move the tape directly with the carriage, to provide mechanical backing for the tape, and to serve as the electrical conductor for contacts 34 as the perforations 104 are sensed by the sensing station 32. Therefore, tape 28 must be taut and against backing plate 30, and positioned sufficiently close to contacts 34 to enable perforations 104 in the program tape to be detected. The construction of preferred tape retainer assemblies 100 and 102 will now be described.

Left tape retainer assembly 100, best shown in FIGURES 2 and 4, contains a tape retainer bail 106 having two longitudinally extending side frames 108 and 110 interconnected at one end by an integrally formed crossbar 112 with spaced bosses 114 extending upwardly therefrom, and connected at the other end as by a plastic handle 116. Pivot bail 118 is a substantially U-shaped link having a central crossbar 120 with spaced bosses 121 extending upwardly therefrom and two depending legs 122, each having apertures aligned with corresponding apertures in side frames 108 and 110 to receive pivot shaft 124. Pivot shaft 124 is held in position as by a pair of lock fasteners 126.

Disposed about pivot shaft 124 are two torsion springs 130, each having a short end portion 131 engaging the under side of crossbar 120 of pivot bail 118 and a long bent end portion 132 engaging the under side of crossbar 112 of tape retainer bail 106. Torsion springs 130, being under load, resiliently bias the tape retainer bail upwardly relative to the pivot bail about the pivot shaft. A threaded bore 134 is provided in the center of crossbar 120 for receiving screw 136 (FIGURE 2) to thereby secure tape retainer assembly 100 to one end of backing plate 30.

Spacer 138 has a central bore 140 for receiving screw 136 and two larger bores 142 for fitting over the projecting bosses 121. With the bosses 121 of crossbar 120 fitting into slot 144 in backing plate 30, tape retainer assembly 100 is rigidly secured to backing plate 30 with crossbar 112 biased upwardly by end 132 of spring 130 into engagement with the edges of slot 146 of backing plate 30. Raising handle 116 upwardly causes crossbar 112 of tape retainer bail 106 to drop below backing plate 30 so that one end of tape 28, which is provided with two perforations to fit over bosses 114, can be engaged by tape retainer bail 106. Upon release of handle 116, crossbar 112 is returned against backing plate 30 by the force of the spring member 130.

Attached to the other end of backing plate 30 is tape retainer assembly 102 which is similar to tape retainer assembly 100 already described, but additionally has means for holding the program tape taut.

In tape retainer assembly 102 (FIGURE 2), two slots 148 are provided in side members 108 and 110 to tape retainer bail 106 in lieu of apparatus for receiving pivot shaft 124. This construction permits longitudinal sliding movement between pivot bail 118 and tape retainer bail 106. As pivot bail 118 is secured to backing plate 30 and guided by rivets 121 through slots 130, only tape retainer bail 106 is movable in the direction of slots 148.

A spring 150 is connected in tension between pivot shaft 124 and a portion of the tape retainer bail such as shaft 152 which may be secured in holes in side members 108 and 110 whereby tape retainer bail 106 is biased away from the center of the carriage. Thus, when tape retainer assembly 102 is connected to one end of program tape 28, which may be by the same manner as described above in connection with tape retainer assembly 100, program tape 28 is held under tension and biased taut against the under side of backing plate 30.

Skew and lateral adjustments of the program tape 28 may be made by loosening screws 136 and sliding the tape retainer assemblies laterally across backing plate 30. Contact assembly 32 is movable in the direction of carriage travel to provide for adjustment of spacing and timing relationship between contact closure and carriage positions.

Where the typewriter carriage is adjusted for printing ten characters per inch, conventional tape perforators which punch ten characters per inch in tape may be used to produce the desired code in the Mylar tape. Bosses 114 on crossbar 112 are preferably so positioned that the tape perforator may be programmed to produce the holes which fit over bosses 114.

An alternative form of spring biased tape retainer assemblies 100 and 102 is shown in FIGURE 5. The modified tape retainer assembly 160 differs from the torsion spring biased in tape retainer assemblies only in that the torsion springs 130 are replaced by a single T-shaped leaf spring 162 which is secured to crossbar 120 of pivot bail 118 as by the extending bosses 121. The extending end 164 of leaf spring 162 engages the under side of crossbar 112 of tape retainer bail 106 to thereby bias the crossbar upwardly. The operation of the tape retainer of FIGURE 5 is the same as that of the corresponding part shown in FIGURE 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a business machine having a fixed base and a carriage movable in column steps relative to said base, a program device operable in response to positions of the carriage, comprising: a program tape having a plurality of columns corresponding to column steps of said carriage, locating means in said tape, means including said locating means for securing said program tape to said movable carriage whereby said program tape is directly moved by said carriage across a reference line, and tape sensing means secured to said base at said reference line and responsive to and actuated by said program tape to thereby provide output signals coresrponding to the position of said movable carriage.

2. In a business machine having a fixed base and a carriage movable in column steps across a printing position, a program device operable in response to the position of said carriage, comprising: a program tape having a plurality of columns, means securing said program tape to said carriage including means on said tape dictating the position of said tape relative to said carriage whereby said program tape moves with said carriage across a reference line in registration with movement of said carriage across said printing position, and tape sensing means mounted on said base at said refrence line responsive to and actuated by said program tape.

3. In a business machine having a fixed base and a carriage movable in column steps across a printing position, a program device operable to condition switches in response to position of said carriage, comprising a program tape having a plurality of columns between spaced end portions, means mounting said end portions of said program tape to spaced positions on said carriage whereby said program tape moves across a reference line in registration with movement of said carriage across said printing position, and tape sensing means mounted on said base at said reference line responsive to and actuated by said program tape for conditioning said switches.

4. In a business machine having a fixed base and a carriage movable in column steps across a printing position, a program device operable to condition switches in response to position of said carriage, comprising a program tape having a plurality of columns, means mounting said program tape to said carriage such that it lies along the carriage in the same direction as carriage movement, said program tape being substantially the same in length as the carriage and being secured at its opposite ends to the carriage, whereby said program tape moves across a reference line simultaneously with movement of said carriage across said printing position, and tape sensing means mounted on said base at said reference line responsive to and actuated by said program tape for conditioning said switches.

5. The business machine as defined in claim 4 further having a backing plate secured to the carriage and in contact with the side of the program tape opposite from the tape sensing means, and tape retainer assemblies mounted on opposite ends of said carriage and holding said program tape under tension.

6. The business machine as defined in claim 5 wherein said tape retainer assemblies comprise: a pivot bail having a crossbar and flanges depending from said crossbar; means fixedly connecting said pivot bail to said backing plate; a tape retainer bail having elongated side frame members connected together at one end by a crossbar and connected together at the other end by an operating handle; means connecting the depending flanges of said pivot bail to the side frame members of said tape retainer bail for relative pivotal movement; and spring means mounted between said pivot bail and said tape retainer bail to bias the crossbar of the tape retainer bail into clamping engagement with said backing plate, said operating handle being manipulatable to pivot said tape retainer bail to move the crossbar of said tape retainer bail out of clamping engagement with said backing plate in opposition to the biasing effect of said spring means.

7. A tape carrier assembly adapted to be fixedly connected to a movable carriage of a typewriter for direct letter spacing movement therewith comprising: an elongated backing plate cantilever supported from said movable carriage; tape retainer means mounted on each end of said backing plate and adapted to clamp a tape to the underside of said backing plate; each of said tape retainer means comprising: a pivot bail secured to the backing plate; said pivot bail being fixedly non-rotatably connected to said backing plate; a tape retainer bail, means pivotally connecting one end of said tape retainer bail to said pivot bail such that the other end of the tape retainer bail is disposed under said backing plate; biasing means connected at one end to the pivot bail and co-'operating with said other end of said tape retainer bail whereby said tape retainer bail is normally biased against said backing plate to clamp a tape between said tape retainer bail and said backing plate, means for pivoting the tape retainer bail away from said backing plate in opposition to the biasing effect of said biasing means to permit loading and unloading of a tape; one of said tape retainer means on one end of said backing plate further including means for holding said tape tautly between said tape retainer means against the backing plate.

8. For use in a data processing system, a typewriter having a perforated program control tape, a backing secured to said typewriter and tape retainer means adapted to coact with said backing plate to clamp said program tape to said backing plate, said tape retainer means comprising: a pivot bail having a crossbar and flanges depending from said crossbar; means fixedly connecting said pivot bail to said backing plate; a tape retainer bail having elongated side frame members connected together at one end by a crossbar and connected together at the other end by an operating handle; means connecting the depending flanges of said pivot bail to the side frame members of said tape retainer bail for relative pivotal movement; and spring means mounted between said pivot bail and said tape retainer bail to bias the crossbar of the tape retainer bail into clamping engagement with said backing plate, said operating handle being manipulatable to pivot said tape retainer bail to move the crossbar of said tape retainer bail out of clamping engagement with said backing plate in opposition to the biasing effect of said spring means.

9. The tape retainer of claim 8 wherein said means for fixedly connecting said pivot bail to the backing plate is adjustable to vary the disposition of a clamping surface of the pivot bail and the backing plate.

10. The tape retainer means of claim 8 wherein said spring means is elongated and extends between said crossbar on said pivot bail toward and under said crossbar of said tape retainer bail whereby said crossbar of said tape retainer bail is directly biased into clamping engagement with said backing plate.

11. The tape retainer means of claim 8 wherein said backing plate contains an aperture and said crossbar on said tape retainer means has a plurality of bosses adapted to engage holes in the tape and extend into said backing plate aperture.

12. The tape retainer assembly of claim 8 wherein said elongated side members have elongated slots and said pivot bail is connected for pivotal movement to said side members by a shaft extending into said slots to permit the pivot bail and tape retainer bail to slide longitudinally relative to one another, an a further spring means connecting said tape retainer bail and said pivot bail in the direction of said slots to bias the crossbars of each bail toward each other.

13. For use in a data processing system, a typewriter having a perforated program control tape, a backing plate secured to said typewriter and tape retainer means adapted to coact with said backing plate to clamp said program tape to said backing plate, said tape retainer means comprising: a pivot bail having a crossbar and flanges depending from said crossbar; means fixedly connecting said pivot bail to said backing plate; a tape retainer bail having elongated side frame members connected together at one end by a crossbar and connected together at the other end by an operating handle; a pivot shaft connecting the depending flanges of said pivot bail to the side frame members of said tape retainer bail for relative pivotal movement; and coil spring means having oppositely extending end portions mounted on said pivot shaft with its oppositely extending ends cooperating respectively with said pivot bail and said tape retainer bail to bias the crossbar of the tape retainer bail into clamping engagement with said backing plate, said operating handle being manipulatable to pivot the crossbar of said tape retainer bail out of clamping engagement with said backing plate in opposition to the biasing effect of said coil spring means.

14. In a business machine having a fixed base and a carriage movable in column steps relative to said base, a program device operable in response to positions of the carriage to condition switches comprising: an elongated backing plate having a metallic undersurface outstandingly supported along one side from said movable carriage; means securing a perforated program tape having a plurality of channels of columnar perforations to the undersurface of said backing plate; a tape sensing station mounted on said fixed base including a plurality of tape sensing contacts corresponding in number to the number of channels in the columnar perforations in said program tape adapted to electrically sense said perforations; and at least two current carrier contacts connected in parallel adapted to ride along the under metallic surface of said backing plate to provide a common current carrier.

15. The business machine of claim 14 wherein said tape sensing station is enclosed by a removable cover member having removably secured thereto brushes adapted to contact and sweep clean said program tape.

16. In a business machine having a fixed base and a carriage movable in descrete steps relative to said base; a program device operable to condition switches in response to moving of the carriage to predetermined discrete step positions comprising: projecting support means secured to said movable carriage; an elongated backing plate having a metallic surface and being releasably mounted on said projecting support means; a perforated program tape having a plurality of rows of perforations spaced at whole multiples of said carriage steps; means securing the program tape to the surface of said backing plate; a tape sensing station mounted on said fixed base including a plurality of tape sensing contacts, corresponding in number to the number of channels in the spaced perforations in said program tape, adapted to electrically sense said perforations; and a contact, comprising at least one conductor, operable to wipe the metallic surface of said backing plate and thereby provide a common current carrier.

17. A business machine as defined in claim 16 wherein said tape sensing station is enclosed by a removable cover member having removably secured thereto non-conducting brushes operable to sweep through the perforations in said program tape.

18. In a business machine having a fixed base and a carriage movable in column steps relative to said base, a program device for providing control signals in response to positions of the carriage, comprising: a program tape having a plurality of columns corresponding to column steps of said carriage, control indicia located in at least one of said columns; sensing means secured to said base, said sensing means being responsive to and actuated by said indicia to provide said signals; means on said carriage and means on said tape for connecting said tape to said carriage and for determining the position of said tape on said carriage for registry of the sensing means with the proper column on said tape for the position of the carriage and means for moving said tape and carriage past said sensing means.

References Cited in the file of this patent
UNITED STATES PATENTS
2,800,539    Edminster et al. _____ July 23, 1957